March 14, 1967   R. A. ROSENBERG   3,309,496
WELDING OF TITANIUM
Filed May 29, 1963

INVENTOR.
ROBERT A. ROSENBERG
BY
Dike, Thompson, Bronstein + Mrose
ATTORNEYS

United States Patent Office 3,309,496
Patented Mar. 14, 1967

3,309,496
WELDING OF TITANIUM
Robert A. Rosenberg, Norwood, Mass., assignor to Mitron Research & Development Corporation, Waltham, Mass., a corporation of Delaware
Filed May 29, 1963, Ser. No. 286,101
21 Claims. (Cl. 219—118)

The present invention relates to improvements in the welding of titanium structural members and, in one particular aspect to novel and improved methods and apparatus for producing high-quality continuous welds between titanium or titanium alloy members in sheet form while obviating the needs for evacuated welding chambers and other costly and cumbersome protective equipment.

This application is a continuation-in-part of my copending application Ser. No. 202,628, filed June 14, 1962, now abandoned for "Welding of Titanium."

As is well understood, titanium and many of its alloys are highly desirable as materials for fabrication of certain types of structural members because of their high strength-to-weight ratios and extraordinary immunity to most corrosives when compared with common engineering metals and alloys. Alloys of titanium are also known to have excellent ductility, high endurance ratios and good fatigue resistance; moreover, their tensile strengths, fatigue limits and hardness tend to increase at very low temperatures. However, this structural metal is unique, and troublesome, in the molten state because it acts as a nearly universal solvent which either dissolves or is contaminated by every known refractory. Heated titanium (above about 1100° F.) unites with oxygen and nitrogen so swifty that all welding processes and the like are customarily performed in evacuated or inert environments in an effort to avoid the drastic reductions in ductility which can result from even relatively slight (ex. 0.5% oxygen, or 0.25% nitrogen) contaminations. Hydrogen likewise produces an embrittling effect, reducing ductility, and it is highly important that moisture and the ambient atmosphere be prevented from reaching the molten material for this reason also. In welding, both the weld bead and the heat-affected adjoining areas of the metal must be scrupulously protected from embrittlement and loss of ductility and toughness due to contamination by impurities such as oxygen, nitrogen, hydrogen, and, also, carbon; therefore, the most effective known techniques insuring the needed degree of isolation involve the use of fully sealed welding chambers and bags (i.e. so-called "dry boxes"). These techniques obviously can be exploited only with members of limited sizes and geometries, and are not applicable in the fabrication or repair of large structures or in welding with portable equipment.

An alternative welding technique, which has been practiced in an effort to overcome certain of the difficulties encountered in the use of dry boxes, has exploited the so-called "heliarc" welding torch wherein the shielding about an electrode directs a flow of inert gas to the site of the welding arc. However, titanium's low tolerance of and high susceptibility to contaminations by hydrogen, oxygen, carbon and nitrogen impurities dictate the exercise of certain precautions which disturb mechanical nicety and handicap efforts to weld complex structures in locations not conveniently accessible. Specifically, such precautions commonly involve the use of backing bars or the like which deliver a curtain of inert gas to the underside of the joint being welded, such that the localized areas which are molten at any instant may be protected by inert gas both from above and below. This technique nevertheless involves pronounced risk of weld contamination, and consequent embrittlement, because of its failure to protect heat-affected areas beyond the immediate weld pool, and because of human errors in manually operating the torch and backing bars. In accordance with the present teachings, such difficulties are overcome by improved practices which may involve, in part, the discharge of an inert gas at the weld site while containing the gas over a broad area below a membrane extending a material distance in directions in and opposite to the intended direction of torch movement to protect heat-affected areas until they may become sufficiently cooled to resist contamination. And, in conjunction with this form of protective gaseous atmosphere, a further special protective film-like gaseous atmosphere is automatically developed by a deposited non-reactive flux which liberates another gas, such as a gaseous chloride, when exposed to the high temperature of heat-affected areas of the welded titanium parts. In the welding of thin titanium sheets, especially, the improved practices preferably involve the use of an adherent form of the non-reactive flux applied to the margins of the undersides of the sheets, and, particularly in the case of thicker sheets (i.e. one-half inch or more), the non-reactive flux material is advantageously combined with low-cost finely-divided titanium sponge and deposited atop the joint where a desired release of gas and melting of the titanium sponge may then occur.

It is one of the objects of the present invention, therefore, to provide novel and improved techniques, apparatus, and materials for the welding of titanium and its alloys.

A further object is to provide an improved an advantageously uncomplicated and economic method for welding titanium parts which avoids embrittling contaminations and which may be practiced readily with low-cost equipment and materials.

Another object is to provide improved apparatus and materials for the sound electric arc welding of ductile joints between titanium parts and which well lend themselves to rapid welding of parts of large expanse and complex geometries while obviating the need for dry boxes.

By way of a summary account of practice of this invention in one of its aspects, an electric arc torch for the welding of relatively thin titanium sheet is provided with a shield or jacketing through which argon gas is discharged at the intended site of the welding arc, generally in a manner known in inert-gas-shielded arc welding. In addition, a transversely-extending membrane is supported in fixed relationship with the torch, at a short distance from its electrode tip, the membrane projecting both forwardly and, to a greater extent, rearwardly of the electrode tip for material distances which insure that the flowing argon gas will continuously flush out and supplant the ambient atmosphere between the membrane and the titanium sheets below, along the line of the intended weld. Rearwardly of the electrode tip, in relation to its direction of movement, there is disposed a discharge tube which continuously funnels a finely-dividde mixture of low-cost titanium sponge and a non-reactive flux containing a halogen compound such as potassium chloride (KCl) onto the weld immediately after it is formed by the advancing torch. Below the intended welded joint, the marginal edges of the two sheets are pre-coated with a special non-reactive flux composition which is paste-like and adheres to these edges in any position in which they are disposed. Preferably, such a flux composition also includes one or more halogen compounds such as barium chloride and/or potassium chloride, together with a suitable water-insoluble liquid binder, and low-impurity powdered titanium sponge. The paste-like qualities of this composition enable it to adhere to the edges of the titanium sheets at normal environmental temperatures, and it contains sufficient quantities of the halogen compound and powdered titanium sponge to enable the halogen compound to adhere to the titanium sheets when melted, with the titanium sponge serving as a carrier. Inasmuch as the halogen compounds present in the paste and deposited powders may otherwise introduce unwanted water, due to their hygroscopic nature, both of these compositions also preferably include a quantity of oxide (such as $Na_2O$, $LiO$ or $K_2O$) which readily react with water at elevated temperatures to form hydroxides which will not decompose under the welding conditions and will not permit the water to adversely affect the weld. At the high temperatures experienced at and near the site of the welding arc, the compositions below and above the weld act to develop protective films of gaseous halide which shield the impurity-sensitive high-temperature titanium from contaminations.

Although the features of this invention which are considered to be novel are set forth in the appended claims, further details as to preferred practices of the invention, as well as the further objects and advantages thereof, may be most readily comprehended through reference to the following description taken in connection with the accompanying drawings, wherein:

Figure 1:
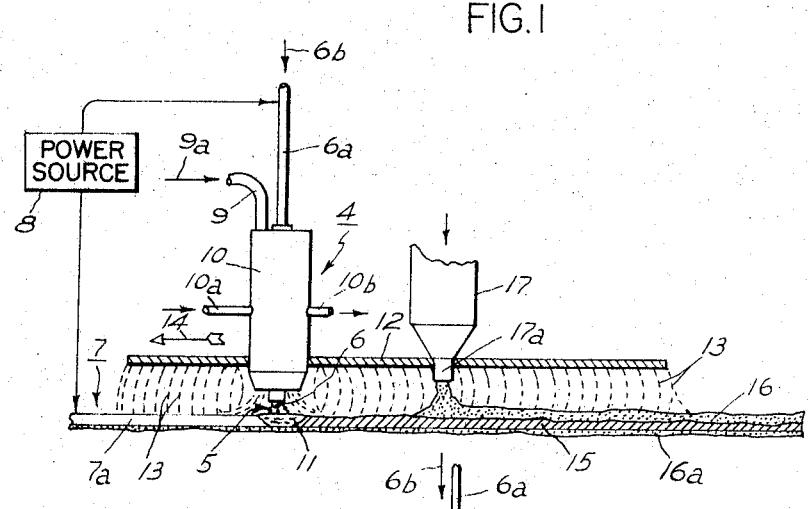
FIGURE 1 depicts portions of an arc welding torch and flux-depositing assembly acting to produce a ductile weld of relatively thin titanium sheets which are protected by a layer of adhesive flux, certain parts being cross-sectioned in the plane of the intended junction between the sheets.

The welding operation characterized in the FIGURE 1 illustration involves a torch unit 4 which develops heat required for fusion by way of an electric arc 5 between an electrode 6 and titanium workpiece 7. The torch electrode may be formed at least in part by a consumable wire, 6a, which is advanced into the torch assembly in direction of the arrow 6b from a suitable supply in a known manner, and the electrode material may comprise titanium, or one of its alloys, or other consumable or non-consumable materials known to be appropriate to the striking of the needed arc without introducing contaminants which would seriously reduce the ductility of the resulting welds. Electric power source 8, which also may be of a conventional form, is coupled between the electrode and conductive titanium workpiece to supply energy required to sustain the arc 5 and thereby generate heat for fusion of parts of the workpiece. In addition, the torch is supplied with an inert gas, such as argon or helium, by an external supply via the inlet conduit 9, the pressurized influx of inert gas from the supply being designated by arrow 9a. This flow of inert gas is in turn discharged at the site of the tip of electrode 6, from a hollow tubular sleeve 6c surrounding the electrode, these provisions being of a conventional form in welding torches such that further details are not reviewed here. Certain forms of such torches also incorporate a jacketing, such as that indicated by numeral 10, for forced circulation of a coolant fluid by way of inlet and outlet conduits 10a and 10b, although these features are not essential in many instances.

Figure 2:
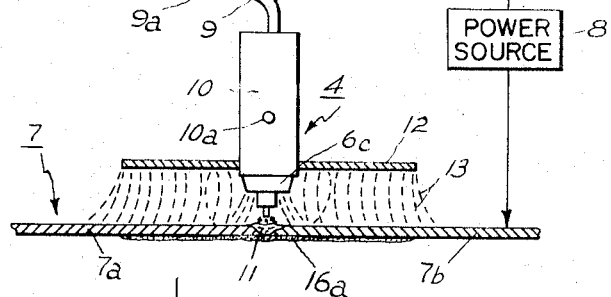
FIGURE 2 represents an assembly such as that of FIGURE 1, with portions cross-sectioned in a plane extending transversely in relation to the intended junction between titanium sheets.

Workpiece 7 is in the form of two relatively thin (example: 0.030 inch thick) titanium sheets 7a and 7b (FIGURE 2) having adjoining edges which are to be united by fusion as the torch is advanced along the path of the intended juncture. At any instant during the welding process, a small molten pool of the titanium, such as that designated by reference character 11, is created and must be carefully isolated from the contaminants for which titanium has such a remarkable affinity in its molten phase. Moreover, the proximate areas of both sheets also tend to become so intensely heated that they readily react with impurities as well, even though unmelted and for this reason the resulting weld bead 7c and nearby metal can escape troublesome embrittlement only if they are rigorously protected. This is true not only in relation to those surface exposures on the side confronting the torch but also in relation to the opposite surfaces below. Three features preferably serve, in concert, to achieve the needed kind and degree of protection for sound welding of the thin titanium sheets: first, the torch unit itself is designed to discharge inert gas and flush out contaminating atmospheres over a relatively broad area extending in advance and laterally of the immediate weld site, but also extending rearwardly over the weld bead for a very material distance; second, a non-reactive flux composition which reacts to generate a protective gaseous cover when subjected to high temperatures is deposited upon the weld bead and adjoining surfaces after the bead is formed but before it leaves the protective inert-gas environment created rearwardly of the weld site; and, third, a further non-reactive adhesive flux composition, which generates a protective gaseous cover when subjected to high temperatures, is pre-coated upon the margins of the titanium sheets, at the edges to be joined, on the sides opposite the sides thereof being operated upon by the welding torch. The illustrated construction for enveloping the desired broad upper area with inert gas involves use of a sheet-metal membrane 12 which is sealed in gas-tight relationship with the torch and which is mounted upon the torch, for movement with it, but a short distance from the tip of its electrode 6. In the course of welding with the torch, membrane 12 is thus disposed in closely-space relationship to the workpiece 7, and the inert gas (such as argon or helium) discharged near the electrode is continuously forced laterally outwardly toward the edges of the membrane, flushing out and wholly supplanting the ambient atmosphere which contains deleterious gases and moisture. Dashed linework 13 in FIGURES 1 and 2 characterizes the flowing protective cover of inert gas, and it will of course be understood that appropriate gas discharge rates will be governed by the membrane-to-workpiece spacing, the latter in turn being large enough to provide clearances needed for the torch electrode structure and for the deposit of a layer of a non-reactive flux composition. As shown, the membrane 12 extends forwardly and laterally of the torch electrode, for a substantial distance at least equal to that at which the surrounding heat-affected workpiece material is known to be likely to reach about 1,000° F. during welding operations. This distance may vary with the type of torch and its rate of movement in use, although it may be determined empirically for each different design of torch unit in accordance with the concepts expressed here. The 1,000° F. level is important in that titanium does not readily absorb or react with nitrogen, hydrogen, oxygen and carbon below that temperature. Rearwardly of the torch (i.e., in direction opposite to the direction of torch movement 14) the gas-shrouding membrane 12 extends for a yet further material distance from the torch electrode, such that the particularly hot metal at and immediately adjacent the newly-formed weld bead 15 will be protectively enveloped by the inert gas for a somewhat longer time needed for its temperature to descend to a lower level at which it is less susceptible to contamination than when freshly melted. Where practical limits on the rearward dimensions of the membrane prevent its extending far enough to insure, for a given rate of torch movement, that the titanium surfaces of interest will be shrouded by the inert gas until they can become cooled to about 1,000° F., then these rearward dimensions may nevertheless be below the theoretical minimum, provided further protection is afforded the heat-affected titanium surfaces by a deposit of special non-reactive flux composition 16.

Composition 16 may conveniently be in the form of finely-divided particles or grains which flow readily from a hopper or container 17 onto the weld bead 15 and the nearby heat-affected areas. The outlet 17a for the reservoir of flux composition is positioned rearwardly of the torch electrode, in a spaced and aligned relationship which insures that the desired mound of composition will develop behind the electrode as the torch is advanced and will cover the weld bead and nearby surfaces of the titanium sheets before they leave the protective cover of the gas-shrouding membrane 12. By the time the trailing edge of membrane 12 advances beyond any portion of the mound or ridge of the flux composition 16, the latter has become intensely heated by the welded titanium and has commenced thermally-induced release of a protective gaseous halide in shielding relationship to the titanium surfaces below. Although the illustrated embodiment of structure producing the inert-gas blanketing has been that of a separate solid membrane, specifically one of substantially planar sheet steel, it should be understood that like satisfactory effects may be obtained using alternative structure, such as an enlarged nozzle at the tip of the torch or an enlarged porous (example: sintered bronze) gas-discharging member, but that these alternative arrangements should also bathe the broad areas of interest with the inert gas and should accommodate the deposite of the non-reactive flux composition rearwardly of the electrode and within the inert-gas cover.

Composition 16 must be essentially non-reactive with titanium at temperatures in the near vicinity of the melting point of titanium, that is, in the solid, liquid or gaseous states it must not so react with solid or molten titanium as to embrittle either the weld or the parent mental. Moreover, this composition should not readily oxidize, spall off, or so change state that the sensitive areas are left unprotected; in addition the composition must lend itself well to depositing onto the titanium sheets and to simple removal after cooling. These qualifications are met by certain finely-divided halide salts which do not react appreciably with titanium at temperatures to about 2,500° K., the highest temperature to be withstood in the welding operation. Preferably, a plentiful low-cost chloride such as potassium chloride (KCl, melting at about 1040° K. and vaporizing at about 1680° K.) is used; thermodynamic calculations of the free energies of reaction between this compound and titanium to form the possible chlorides of titanium ($TiCl_2$, $TiCl_3$ and $TiCl_4$) provide evidence of the relative inertness of the compound for the present purposes (i.e., the free energy of formation of $TiCl_4$ in reaction with KCl is but about 112 kilogram calories per mole, at 2,500° K.; of $TiCl_3$ but about 69 kcal./mole; and of $TiCl_2$ but about 40 kcal./mole). Magnesium chloride ($MgCl_2$) is found to be a very desirable material for these purposes also. Similar conditions of non-reactivity with titanium are found in the case of other halides, the characterizing free energy of reaction, $\Delta F_r$, at 2,500° K. being as follows (in kcal./mole) in selected instances:

| Reaction Product Produced: | $TiCl_4$ | $TiCl_3$ | $TiCl_2$ |
|---|---|---|---|
| a. $\Delta F_r$, Titanium in reaction with NaCl | 90 | 52.5 | 29 |
| b. $\Delta F_r$, Titanium in reaction with $CaCl_2$ | 124 | 78 | 46 |
| c. $\Delta F_r$, Titanium in reaction with $BaCl_2$ | 144 | 93 | 56 |
| d. $\Delta F_r$, Titanium in reaction with $MgCl_2$ | 32 | 9 | 0 |

| Reaction Product Produced: | $TiF_4$ | $TiF_3$ | $TiF_2$ |
|---|---|---|---|
| a. $\Delta F_r$, Titanium in reaction with NaF | 12 | 9 | 30 |
| b. $\Delta F_r$, Titanium in reaction with KF | 12 | 9 | 30 |
| c. $\Delta F_r$, Titanium in reaction with $CaF_2$ | 84 | 63 | 66 |
| d. $\Delta F_r$, Titanium in reaction with $BaF_2$ | 92 | 69 | 70 |

In addition to the chlorides and fluorides, bromides and iodides are suitable agents, the latter having the greater atomic weights and, thus, decreased reactivity. The halide salt used in composition 16 is comminuted to have flowing characteristics of powdered or granulated material, such that it can be deposited in a stream as the torch unit is moved along during welding. Depending upon the temperatures experienced by the flux composition, it will develop a liquid or gaseous film atop the heat-affected titanium surfaces, thereby effectively screening out contaminants from the ambient environment and preserving ductility of the titanium as it cools.

It is found that a non-reactive flux material having a relatively low melting point can also be used advantageously in some instances to improve the protective actions. Stannous chloride ($S_nCl_2$) produces this desired effect, and is preferably used in small amounts, such as a few percent (example: 1–2%), by weight of the non-reactive flux composition; the balance of the composition may, in one example, include about 55–65% NaCl and 35–45% KCl, by weight. The stannous chloride starts melting at a relatively low temperature of the order of about 500° F. (more specifically about 475° F.; the boiling point being about 1153° F.) and it thus affords desired shielding effects well before the titanium material has actually begun to become molten, but while it is hot enough to be susceptible to contamination. The other chlorides melt and are principally effective at significantly higher temperatures; KCl melts at about 1040° K. and vaporizes at 1680° K.

Because of the hygroscopic nature of the halides, the heated or molten titanium is preferably protected from the contaminating effects of water from that source. For this purpose, a small quantity of a hydroxide-forming oxide, such as $Na_2O$, $Li_2O$ or $K_2O$ (up to about 5% by weight of the entire flux composition), is included in the finely-divided composition. These oxides react readily with any water which may be present, especially at elevated temperatures, to form hydroxides (such as NaOH, LiOH, and KOH) which do not decompose, thereby providing the desired protective isolation from such moisture.

In addition to the halides and hydroxide-forming oxides, the non-reactive flux composition 16 may advantageously include finely-divided titanium particles. The finely-divided particles of titanium, or of titanium alloys including substantially no contaminating material, may comprise a powder, and may be added in an amount such as about 2%, by weight, of the non-reactive composition. Titanium sponge can be used economically for such purposes. To the extent that such sponge may melt, it introduces no significant impurities, and to the extent that it does not, it serves as an essentially non-reactive carrier for the melted halide fluxing agent. Preferably, the titanium sponge is no coarser than a granular form, and is best in the nature of a powder, such that it will mix with the melted fluxing agent to impart body which holds it in place without dripping, running or spalling from the surface areas which are to be protected over a sustained period. The percentage of powdered sponge used in the composition is thus largely dictated by mechanical considerations, i.e. the self-sustaining consistency of the composition when the halides are molten, and the ranges may vary, provided, of course, that enough of the halide fluxing agent is always present to spread itself as a cover for the surfaces to be protected. Advantageously, the titanium-sponge carrier can be obtained at relatively low cost, and is desirably oxygen-free. In the conventional Kroll-type process, for example, titanium tetrachloride is first obtained by chlorinating an oxide-carbon mixture, and the titanium tetrachloride is next reduced to titanium sponge through reduction of the chloride by magnesium before ingots are formed; such sponge is relatively inexpensive and is highly desirable for the present purposes when ground to small particle sizes.

On their sides opposite the torch electrode, the thin titanium sheets 7a and 7b are pre-coated with a non-reactive flux composition 16a before welding commences.

This composition is generally like the composition 16 deposited upon the upper surfaces of these sheets (i.e. contains the finely-divided halides and hydroxide-forming oxides as described), except that it is caused to be adherent and to sustain itself upon the marginal and near-marginal areas of the sheets after being applied to them by spreading, wiping, brushing or the like. The desired paste or fluid consistency, and the desired adhesiveness to the titanium, at room temperature, are achieved by including a liquified binder material in the composition 16a. Such a binder material should not contain water, hydrogen or carbon, nor be water soluble, for reasons discussed earlier herein, and titanium tetrachloride and silicon tetrachloride comprise suitable examples, the percentages being selected to yield the fluidity desired. As the welding torch is advanced along the top of the abutting titanium sheets, the layer of pre-coated composition 16a is effective to screen the heat-affected surfaces below from contamination. Whatever amount of finely-divided titanium sponge may be included in the weld is non-contaminating, and the remainder serves as an unmelted carrier for the molten fluxing agent, causing it to cling together and to the areas which are to be protected. The molten fluxing agent thus provides a protective liquid covering for these heat-affected surfaces, and the gaseous halide (example: potassium chloride gas) released at the high temperatures provides a protective gaseous film which screens out the troublesome contaminants. Whatever minute amounts of oxygen penetrate the protective material are readily removed by grinding, since the contaminating phenomena are confined to surface volumes only. It should be understood that in some practices the inert gas shielding 13 and paste shielding 16a may suffice to protect the top and bottom of the weld to a satisfactory extent, and that the hopper unit 17 and composition 16 then need not be used.

Figure 3:
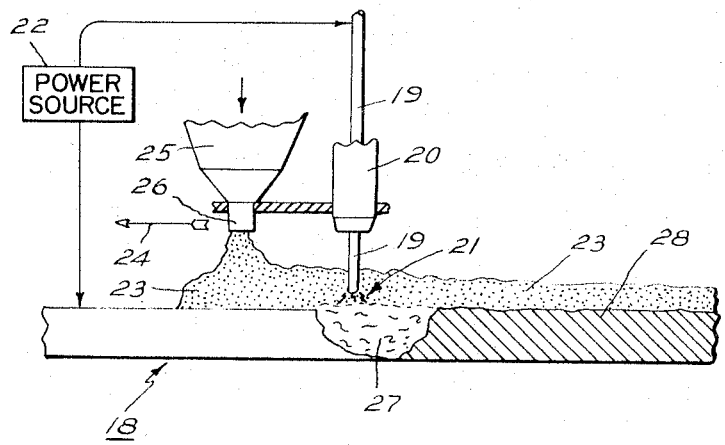
FIGURE 3 portrays an alternative arrangement for the welding of relatively thick titanium sheets, in a side view with portions cross-sectioned in the plane of the intended junction.

Thicker titanium parts, such as sheets between about one-half inch and an inch in thickness, are preferably welded with the electric arc submerged in the special non-reactive flux composition. This arrangement is portrayed in FIGURE 3, wherein the workpiece 18 comprises a pair of thick sheets of titanium or titanium alloy having straight edges in abutting relationship for the desired fusion, and wherein an automatically-fed consumable welding electrode 19 of the same material is held by torch 20 in position to maintain an arc 21 of particularly high current density in response to excitation of the workpiece and electrode by the electrical power source 22. In the welding of thick members it is advantageous that the required depth of fusion be achieved with a minimum number of passes of the movable torch unit, and this is particularly critical in the case of titanium and its alloys because of their unusually high susceptibility to embrittling contaminations whenever the temperature exceeds about 1,000° F. According to the present teachings, such welding is performed with the arc submerged below a mound of special flux composition 23 which is deposited upon the workpiece ahead of torch 20 as it is advanced in the direction indicated by arrow 24. For these purposes, a container 25 is affixed to the torch unit, and its outlet 26 for discharge of the flux composition is generally aligned with the line of sheet abutment where fusion is to take place. Rate of discharge is maintained great enough to develop a high mound of the composition 23 which will permit the electrode to be submerged within it and which will spread itself laterally over the heat-affected areas requiring protection against contamination. Outlet 26 is also oriented forwardly of the electrode by a distance sufficient to insure that heat-affected areas ahead of the molten pool 27 at any instant are well protected by a covering of the special flux composition.

Composition 23 preferably includes the materials already referred to in the descriptions of flux composition 16, and is preferably of finely-divided form having powder or granular consistencies. However, a large portion of the titanium sponge is expected and intended to melt at the immediate site of the molten pool 27, where there is an intense concentration of heat from the submerged high-current-density arc 21. The powdered, or otherwise finely-divided, titanium sponge has a low impurity content (example: the so-called MD–120 titanium sponge) and melts to form a liquid cover atop the molten pool developed by melting of the base or parent metal and the consumable electrode. While this liquid covering may to some extent absorb contaminating carbon, nitrogen, oxygen and hydrogen, the covering remains and later solidifies at the top of the weld bead 28 where it may be cleaned away, by grinding or the like, if necessary. The titanium sponge is not seriously contaminated however, because the flux composition includes a finely-divided halogen compound or compounds, such as those mentioned hereinabove, preferably $MgCl_2$ and/or $KCl$ and/or $BaCl_2$. The halide or halides in the flux composition have both the effect of producing a protective liquid cover over the areas of interest when molten, and the effect of producing a protective gaseous halide film cover (such as gaseous potassium chloride) when at higher temperatures. The powdered titanium sponge which is not melted functions as a carrier holding the molten halide together, such that it will remain in place over the areas to be protected while they are cooling after the fusion has occurred. Sensitive areas heated to about 1200° F. or above thus remain shielded against contamination from the ambient atmosphere. At the immediate site of the molten pool 27, the titanium sponge and halide cover aid in concentrating the arc heat and thereby promote deep welding which permits relatively thick titanium and titanium alloy members to be thoroughly fused in but a single pass of the electric torch. Composition 23 may advantageously include a small quantity (example: to about 5% by weight) of additive oxides (such as $Na_2O$, $Li_2O$ or $K_2O$) which react with any water present in the hygroscopic halides to form hydroxides which will not decompose during the welding, and, where a paste-like consistency of the composition is desired, a liquid binder such as the aforementioned titanium tetrachloride and silicon tetrachloride may be included to impart the required adhesive and flowing characteristics.

Certain of the welding techniques described and illustrated in this application are intended to be representative, rather than of a limiting character. For example, another preferred welding process in which these teachings are applicable with advantage is the known plasma arc process, wherein high voltages and ionized inert gas develop a very constricted arc, either of the direct-transfered or non-transferred type, especially suited to needs of high-speed welding.

Therefore, while specific practices have been described, and while preferred embodiments and materials have been discussed, it should be understood that various changes, modifications, additions and substitutions may be effected by those skilled in the art without departure from these teachings, and it is aimed in the appended claims to embrace all such variations as fall within the true spirit and scope of this invention.

What I claim as new and desire to secure by Letters of Patent of the United States is:

1. The process of forming ductile welds of workpieces of titanium and alloys thereof substantially free of hydrogen, nitrogen, oxygen and carbon which comprises generating an electric arc between a workpiece and an electrode to fuse adjoining parts of the workpiece and thereby form a weld therebetween, and protecting the welded parts against embrittling contaminations while at high temperatures, the protecting process including mixing and applying to heat-affected surfaces of said workpiece the mixture of finely-divided particles consisting essentially of titanium with a non-reactive flux consisting essentially of at least one finely-divided halide which at temperatures above about 1,000° F. generates a protective gaseous halide film which shields said surfaces against atmospheric contaminants, whereby unmelted amounts of said finely-divided particles hold quantities of the melted flux together on the heat-affected surfaces in protective relationship thereto, and maintaining said flux in contact with said heat-affected surfaces until they cool below about 1,000° F.

2. The process of forming ductile welds of titanium and alloys thereof as set forth in claim 1 wherein said mixing is performed with said finely-divided particles in the form of a powder and which comprises mixing the powder with said non-reactive flux to form said composition in which about two percent by weight comprises said powder.

3. The process of forming ductile welds of workpieces of titanium and alloys thereof substantially free of hydrogen, nitrogen, oxygen and carbon which comprises generating an electric arc between a workpiece and an electrode to fuse adjoining parts of the workpiece and thereby form a weld therebetween, and protecting the welded parts against embrittling contaminations while at high temperatures, the protecting process including mixing and applying to heat-affected surfaces of said workpiece the mixture of finely-divided titanium sponge with a non-reactive flux consisting essentially of at least one finely-divided halide which at temperatures above about 1,000° F. generates a protective gaseous halide film which shields said surfaces against atmospheric contaminants, whereby unmelted amounts of said finely-divided titanium sponge hold quantities of the melted flux together on the heat-affected surfaces in protective relationship thereto, and maintaining said flux in contact with said heat-affected surfaces until they cool below about 1,000° F.

4. The process of forming ductile welds of titanium and alloys thereof as set forth in claim 3 which further comprises mixing said non-reactive flux and titanium sponge with a finely-divided oxide which reacts with water content of said flux to form a hydroxide which does not decompose at temperatures of said heat-affected surfaces.

5. The process of forming ductile welds of workpieces of titanium and alloys thereof substantially free of hydrogen, nitrogen, oxygen and carbon which comprises generating an electric arc between a workpiece and an electrode to fuse adjoining parts of the workpiece and thereby form a weld therebetween, and protecting the welded parts against embrittling contaminations while at high temperatures, the protecting process including blanketing the arc and a broad area of heat-affected surfaces surrounding the arc which are raised to a temperature about about 1,000° F. with a covering of inert gas by continuously forcing said inert gas onto said surfaces while physically shielding said covering and surfaces against the ambient environment, mixing and applying to surfaces of said workpiece opposite the gas-covered surfaces the mixture of a non-reactive flux consisting essentially of at least one finely-divided halide which at temperatures about about 1,000° F. generates a protective gaseous halide film which shields said surfaces against atmospheric contaminants together with a water-insoluble liquid binder which is non-reactive with the flux and the material of said workpiece and wets the workpiece material at room temperature, and maintaining said flux in contact with said heat-affected surfaces until they cool below about 1,000° F.

6. The process of forming ductile welds of workpieces of titanium and alloys thereof substantially free of hydrogen, nitrogen, oxygen and carbon which comprises generating an electric arc between a workpiece and an electrode and moving the electrode relative to the workpiece to fuse adjoining parts of the workpiece and thereby form a continuous weld seam therebetween, and protecting the welded parts against embrittling contaminations while at high temperatures, the protecting process including continuously blanketing the arc and a broad area of heat-affected surfaces surrounding the arc which are raised to temperatures above about 1,000° F. with a covering of inert gas by continuously forcing said inert gas onto said surfaces while physically shielding and covering said surfaces against the ambient environment, depositing onto the weld seam and said surfaces after the workpiece parts are fused but before said seam and surfaces are removed from the covering of inert gas a non-reactive flux consisting essentially of at least one finely-divided halide which at temperatures above about 1,000° F. generates a protective gaseous halide film which shields said surfaces against atmospheric contaminants, applying to the surfaces of said workpiece in mixture with a water-insoluble liquid binder which is non-reactive with the flux and the material of said workpiece and wets the workpiece material at room temperature, and maintaining said flux in contact with said heat-affected surfaces until they cool below about 1,000° F.

7. The process of forming ductile welds of workpieces of titanium and alloys thereof substantially free of hydrogen, nitrogen, oxygen and carbon which comprises generating an electric arc between a workpiece and an electrode moved relative to said workpiece to fuse adjoining parts of the workpiece and thereby form a continuous weld seam therebetween, and protecting the welded parts against embrittling contaminations while at high temperatures, the protecting process including mixing and applying onto the workpiece in advance of the arc to protectively cover the arc and heat-affected surfaces of the workpiece during fusion a non-reactive flux consisting essentially of at least one finely-divided halide which at temperatures above about 1,000° F. generates a protective gaseous halide film which shields said surfaces against contaminants together with finely-divided titanium sponge, whereby at least part of the titanium sponge melts to form a protective layer on the molten pool of the weld and at least part of the unmelted titanium sponge holds the melted flux together on the heat-affected surfaces in protective relationship thereto, and maintaining said flux in contact with said heat-affected surfaces until they cool below about 1,000° F.

8. The process of forming ductile welds of titanium and alloys thereof substantially free of hydrogen, nitrogen, oxygen and carbon which comprises generating an electric arc between a workpiece and an electrode to fuse adjoining parts of the workpiece and thereby form a weld therebetween, and protecting the welded parts against embrittling contaminations while at high temperatures near the melting temperature of the workpiece, the protecting process including applying to the heat-affected surfaces of the adjoining parts on at least one side of said workpiece a non-reactive flux consisting essentially of at least one finely-divided halide selected from the group of sodium chloride, potassium chloride, barium chloride, calcium chloride, magnesium chloride, barium fluoride, and calcium fluoride, said halide generating a continuous covering of protective gaseous halide film across said surfaces at temperatures near the melting temperature of the workpiece to shield said surfaces against atmospheric contaminants, and maintaining said flux in contact with said heat-affected surfaces as a continuous covering until they cool below said high temperatures.

9. The process of forming ductile welds of titanium and alloys thereof substantially free of hydrogen, nitrogen, oxygen and carbon which comprises generating an electric arc between a workpiece and an electrode to fuse adjoining parts of the workpiece and thereby form a weld therebetween, and protecting the welded parts against embrittling contaminations while at high temperatures near the melting temperature of the workpiece, the protecting process including mixing and applying to the heat-affected surfaces of said workpiece a non-reactive flux consisting essentially of at least one finely-divided halide selected from the group of sodium chloride, potassium chloride, barium chloride, calcium chloride, magnesium chloride, barium fluoride, and calcium fluoride, together with finely-divided titanium sponge, said halide generating a protective gaseous halide film at temperatures near the melting temperature of the workpiece to shield said surfaces against atmospheric contaminants, whereby unmelted amounts of said titanium sponge hold quantities of the melted flux together on the heat-affected surfaces and melted amounts of said titanium sponge protectively cover the parent metal of the workpiece in the weld bead, and maintaining said flux in contcat with said heat-affected surfaces until they cool below said high temperatures.

10. The process of forming ductile welds of titanium and alloys thereof substantially free of hydrogen, nitrogen, oxygen and carbon which comprises generating an electric arc between a workpiece and an electrode to fuse adjoining parts of the workpiece and thereby form a weld therebetween, and protecting the welded parts against embrittling contaminations while at high temperatures near the melting temperatures of the workpiece, the protecting process including mixing and applying to the heat-affected surfaces of said workpiece a non-reactive composition including a nonreactive flux consisting essentially of at least one finely-divided halide selected from the group of sodium chloride, potassium chloride, barium chloride, calcium chloride, magnesium chloride, barium fluoride, and calcium fluoride, together with finely-divided material, said halide generating a protective gaseous halide film at temperatures near the melting temperatures of the workpiece to shield said surfaces against atmospheric contaminants, said mixing further comprising mixing said non-reactive flux with at least one finely-divided oxide selected from the group of sodium oxide, lithium oxide and potassium oxide, said oxide comprising up to about five percent by weight of said non-reactive composition, whereby said oxide reacts with the water content of said flux to form a hydroxide which does not decompose at temperatures of said heat-affected surfaces, and maintaining said flux in contact with said heat-affected surfaces until they cool below said high temperatures.

11. The process of forming ductile welds of titanium and alloys thereof as set forth in claim 9, wherein the process of protecting the welded parts includes applying the mixture of said flux and titanium sponge to heat-affected surfaces in mixture with a water-isoluble liquid binder which wets the workpiece material at room temperatures and is selected from the group of titanium tetrachloride and silicon tetrachloride.

12. The process of forming ductile welds of titanium and alloys thereof substantially free of hydrogen, nitrogen, oxygen and carbon which comprises generating an electric arc between a workpiece and an electrode and moving said electrode relative to said workpiece to fuse adjoining parts of the workpiece and thereby form a continuous weld seam therebetween, blanketing the arc and a board area of heat-affected surfaces surrounding the arc which are raised to temperatures above about 1,000° F. with a covering of inert gas by continuously forcing said inert gas into said surfaces while physically shielding said covering and surfaces against the ambient environment, said shielding including shielding of said weld seam for a material distance rearwardly of said electrode, and mixing and continuously depositing onto the weld seam and nearby heat-affected surfaces of said workpiece rearwardly of said electrode and within the protective covering of said shielding rearwardly of said electrode a nonreactive flux consisting essentially of at least one finely-divided halide selected from the group of potassium chloride, sodium chloride, magnesium chloride, barium chloride, calcium chloride, barium fluoride and calcium fluoride, which generates a protective gaseous halide covering for said heat-affected surfaces at high temperatures, together with finely-divided titanium sponge, and maintaining said flux in contact with said heat-affected surfaces until they are cooled.

13. A non-reactive flux composition for use in the electric arc welding of titanium and alloys thereof comprising a non-reactive flux consisting essentially of at least one finely-divided halide which decomposes at temperatures above about 1,000° F. to liberate a protective gaseous halide atmosphere, and finely-divided particles consisting essentially of titanium mixed with said flux.

14. A non-reactive flux composition for use in the electric arc welding of titanium and alloys thereof as set forth in claim 13 further comprising at least one finely-divided oxide which reacts with water content of said flux to form a hydroxide which does not decompose at titanium welding temperatures, said oxide comprising up to about 5% of the composition by weight.

15. A non-reactive flux composition for use in the electric arc welding of titanium and alloys thereof as set forth in claim 13 wherein said finely-divided non-reactive flux is selected from the group of potassium chloride, sodium chloride, magnesium chloride, barium chloride, calcium chloride, barium fluoride, and calicum fluoride.

16. A non-reactive flux composition for use in the electric are welding of titanium and alloys thereof as set forth in claim 15 further comprising finely-divided stannous chloride in the amount of about 1–2% by weight of said flux.

17. A non-reactive flux composition for use in the electric arc welding of titanium and alloys thereof as set forth in claim 14 wherein said finely-divided oxide is selected from the group of sodium oxide, lithium oxide and potassium oxide.

18. A non-reactive flux composition as set forth in claim 13 for application as a weld backing which adheres to titanium and alloys thereof, further comprising in mixture with said finely-divided flux and particles a water-insoluble liquid binder which is non-reactive with the flux and titanium and alloys thereof and wets the titanium and alloys thereof at room temperature.

19. A non-reactive flux composition as set forth in claim 18 wherein said liquid binder is selected from the group of titanium tetrachloride and silicon tetrachloride.

20. A non-reactive flux composition as set forth in claim 13 wherein said particles form a powder which comprises about two percent by weight of said flux.

21. A non-reactive flux composition as set forth in claim 13 wherein said particles comprise titanium sponge.

References Cited by the Examiner
UNITED STATES PATENTS

| | | | |
|---|---|---|---|
| 1,923,375 | 8/1933 | Holt | 219—146 |
| 2,819,158 | 1/1958 | Johnston | 219—118 X |

OTHER REFERENCES

"Submerged-Arc Welding of Uranium," September 1958, "Welding Journal," pages 890–896.

JOSEPH V. TRUHE, *Primary Examiner.*